(12) United States Patent
Fusegi

(10) Patent No.: US 7,892,134 B2
(45) Date of Patent: Feb. 22, 2011

(54) CLUTCH DEVICE AND DIFFERENTIAL DEVICE USING THE SAME

(75) Inventor: Masaaki Fusegi, Shimotsuga-gun (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 419 days.

(21) Appl. No.: 11/514,778

(22) Filed: Aug. 31, 2006

(65) Prior Publication Data

US 2007/0054771 A1 Mar. 8, 2007

(30) Foreign Application Priority Data

Sep. 2, 2005 (JP) ............................ 2005-255464
Jul. 4, 2006 (JP) ............................ 2006-184240

(51) Int. Cl.
*F16H 48/20* (2006.01)
(52) U.S. Cl. ..................................... 475/235
(58) Field of Classification Search ................ 475/230, 475/231, 234, 235, 236
See application file for complete search history.

(56) References Cited

U.S. PATENT DOCUMENTS 6,165,095 A * 12/2000 Till et al. .................... 475/150

2002/0155913 A1* 10/2002 Fusegi et al. ................. 475/231
2003/0121750 A1* 7/2003 Teraoka .................... 192/93 A

FOREIGN PATENT DOCUMENTS

JP 2004-100924 4/2004

* cited by examiner

*Primary Examiner*—David D Le
*Assistant Examiner*—Derek D Knight
(74) *Attorney, Agent, or Firm*—Morrison & Foerster LLP

(57) ABSTRACT

A clutch device 2 has a diff case 19 rotatable with drive torque, side gears 11, 13 to which the drive torque is transferred from the diff case 19, a clutch ring 63 held in constant connection to the diff case 19 and axially movable to the side gears 11, 13 to be intermittently coupled thereto, and an electromagnetic actuator 29 operative to axially move the clutch ring 63. The electromagnetic actuator 29 includes an electromagnetic solenoid 25, and a plunger 27 axially movable in response to magnetic force of the electromagnetic solenoid 25 for axially moving the clutch ring 63. The electromagnetic solenoid 25 is disposed on the diff case 19 so as not to relatively move in an axial direction, and the diff case 19 forms a part of a magnetic flux path of the electromagnetic solenoid 25.

7 Claims, 10 Drawing Sheets

US 7,892,134 B2

CLUTCH DEVICE AND DIFFERENTIAL DEVICE USING THE SAME

BACKGROUND OF THE INVENTION

1. Field of the Invention

The present invention relates to a clutch device and a differential device using the same.

2. Description of the Related Art

A differential device, disclosed in Japanese Patent Application Laid-Open No. 2004-100924, is comprised of a diff case, a bevel type differential mechanism connected to the diff case, a differential limiting mechanism forming a clutch device, an electromagnetic actuator and others. The differential mechanism includes a side gear spline coupled to an output shaft, a pinion gear held in meshing engagement with the side gear, and a pinion shaft supported with the diff case and supporting the pinion gear. The electromagnetic actuator is comprised of a plunger and an electromagnetic solenoid operative to move the plunger using magnetic force to actuate the differential limiting mechanism. Also, a ring gear is fixedly supported on the diff case applied with drive power from a prime mover.

With such a differential device described above, a magnetic flux path generated by the electromagnetic actuator including the plunger is closed only in this actuator. Thus the attempt of installing this differential device on a vehicle occurs interference between the electromagnetic actuator and a bearing with which the diff case is supported. Since this restricts a variety of models (of differential device) to which the electromagnetic actuator can be installed, the clutch device involving the electromagnetic actuator needs to have a large size in structure.

With such a differential device described above, further, the differential limiting mechanism is disposed in a rotary system and the electromagnetic actuator is disposed in a stationary system. The clutch ring, playing a role as a side member of the differential limiting mechanism (mating clutch), is positioned on the diff case with respect to an axial direction, and the plunger, playing a role as one member of the electromagnetic actuator, is held in abutment with the electromagnetic solenoid and positioned in the axial direction.

The positioning of the clutch ring and the plunger independently from each other in such a way leaves a clearance between these component parts. Since this increases a stroke needed for the plunger of the electromagnetic solenoid to move in an increased stroke by that extent, the electromagnetic solenoid needs to have a large size in structure.

SUMMARY OF THE INVENTION

The present invention has been completed with the above issues in mind and has an object to provide a small-size clutch device and a differential device employing this clutch device.

A first aspect of the present invention provides a clutch device comprising an input member rotatable with drive torque, an output member to which the drive torque is transferred from the input member, a clutch member held in constant connection with one member of the input member or the output member and axially movable to the other member to be intermittently coupled, and an electromagnetic actuator including an electromagnetic solenoid and a plunger axially movable in response to magnetic force generated by the electromagnetic solenoid to axially shift the clutch member, wherein the electromagnetic solenoid is disposed on the one member so as not to relatively move in an axial direction and the one member serves as a part of a magnetic flux path of the electromagnetic solenoid.

A second aspect of the present invention provides a differential device comprising an input member rotatable with drive torque, a differential member to which the drive torque is transferred from the input member, a differential mechanism including first and second output members relative-rotatably coupled with the differential member via a torque transfer section that receives the drive torque, a differential limiting mechanism including a clutch limiting differential rotation of the differential mechanism, and an electromagnetic actuator having an electromagnetic solenoid and a plunger axially movable in response to magnetic force generated by the electromagnetic solenoid to axially shift the clutch member, wherein the electromagnetic solenoid is disposed on the input member so as not to relatively move in an axial direction and the input member serves as a part of the electromagnetic solenoid.

DETAILED DESCRIPTION OF THE PREFERRED EMBODIMENTS

First Embodiment

Figure 1:
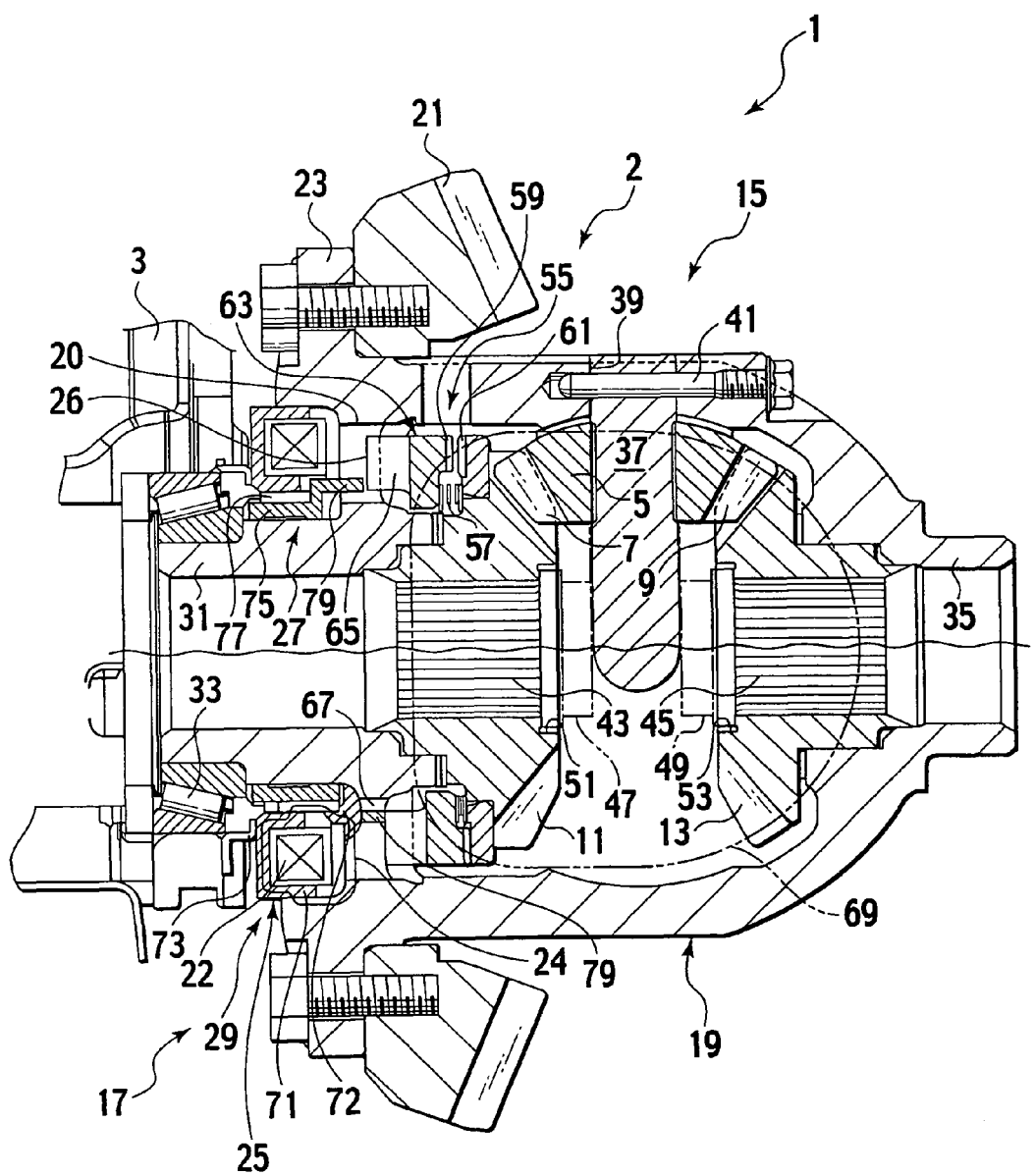
FIG. 1 is a cross-sectional view showing a rear diff of a first embodiment.

There will be explained a clutch device 2 of a first embodiment and a differential device (rear diff) 1 using the clutch device 2 with reference to FIG. 1. In the following description, the term "lateral direction" represents the transverse direction of a 4WD vehicle to which the rear diff 1 is applied.

[Features of Clutch Device 2 and Rear Diff 1]

The clutch device 2 includes a diff case (an input member to which drive power is delivered from a prime mover such as an engine) 19 rotatable in response to applied drive torque; a pair of side gears (output members to which drive power is delivered from the prime mover such as the engine) 11, 13 to which drive torque is transmitted from the diff case 19; a clutch ring (clutch member) 63 held in constant connection to one member (for instance, the diff case 19) of the diff case 19 or the pair of side gears 11, 13 and operative to move toward the other member (for instance, the side gears 11, 13) in an axial direction for intermittent connection thereto; and an electromagnetic actuator 29 operative to axially move the clutch ring 63. Also, when drive torque is returned to the diff case 19 from vehicle wheels, it can be regarded that the pair of side gears 11, 13 represents the input member and the diff case 19 represents the output member.

The rear diff 1, employing the clutch device 2, is accommodated in a carrier 3. The rear diff 1 includes the diff case (input member) 19 rotatable in response to applied drive torque; a pinion 5 that is rotatable; the pair of side gears (output members to which drive power is delivered from the prime mover such as the engine) 11, 13 held in meshing engagement (in connection for relative rotation with respect to each other) with the pinion 5 via mating portions (torque transfer portions) 7, 9 that receives drive torque); a differential mechanism (of a bevel gear type) 15 coaxially rotatable with the diff case 19; and a differential limiting device 17 for limiting the differential rotation of the differential mechanism 15.

The differential limiting device 17 includes an electromagnet type actuator 29 that controls the differential rotation of the differential mechanism 15, and the input member includes the diff case 19 in which the differential mechanism 15 is accommodated. The diff case 19 includes a flange (flange portion) 23 to which a ring gear 21 is fixedly mounted to deliver drive torque from the engine.

The electromagnet type actuator 29 includes an electromagnetic solenoid 25, and an annular plunger 27 operative to axially move in response to magnetic force generated by the electromagnetic solenoid 25 to axially shift the clutch ring 63. The electromagnetic solenoid 25 is mounted on the diff case 19 for non relative-displacement thereof in the axial direction, and the diff case 19 forms a part of a magnetic flux path generated by the electromagnetic solenoid 25.

More particularly, the electromagnetic solenoid 25 includes an annular coil 22 placed on the outer periphery of a boss portion 31 of the diff case 19, and a coil housing 71 that annularly covers the outer periphery of the coil 22, the sidewall of the coil 22 on one side thereof in the axial direction and a part of the inner periphery of the coil 22. As the coil 22 of the electromagnetic solenoid 25 is supplied with electric current, there is formed a magnetic flux path 24 permeating through the coil housing 71 placed around the coil 22, the plunger 27, an annular protruding portion 72 formed on the diff case 19 in partially cutout portions, and a sidewall 20 of the diff case 19. Then the plunger 27 is subjected to operating force, the resultant magnetic force, to move in the axial direction.

The electromagnetic solenoid 25 is disposed on one side (leftward in FIG. 1) of the diff case 19 in an area closer to the ring gear 21 in the axial direction, and is supported by the carrier 3. The sidewall 20 of the diff case 19 forms a part of the magnetic flux path of the electromagnetic solenoid 25, and the plunger 27 is supported on the outer periphery of the boss portion 31 of the diff case 19.

When of the 4WD vehicle runs under a 4WD mode and a 2-4 shift mechanism incorporated in a transfer is coupled, drive power generated by the engine is delivered from a rear-wheel propeller shaft to the rear diff 1 and then distributed to left and right wheels, while the drive power is also transferred to a front diff via the 2-4 shift mechanism and a front-wheel propeller shaft and distributed to left and right front wheels.

When the 4WD vehicle runs under a 2WD mode and the connection of the 2-4 shift mechanism is released, the 4WD vehicle enters a 2WD state for the rear wheels to be driven.

[Structures of Clutch Device 2 and Rear Diff 1]

With the present embodiment, the clutch device 2 includes the differential limiting device 17 that combines (locks) the side gear 11 and the diff case 19, and the electromagnetic actuator 29.

The diff case 19 is integrally formed and disposed inside the carrier 3. The diff case 19 has the boss portion (left boss portion) 31 and other boss portion (right boss portion) 35 that are supported with the carrier 3 by means of a bearing 33 and another bearing (not shown), respectively. The ring gear 21 is fixedly mounted on the flange 23 of the diff case 19 by means of bolts and the diff case 19 is rotatably driven due to drive power of the engine input through the ring gear 21.

With the differential mechanism 15, the pinion 5 is supported on a pinion shaft 37. The pinion shaft 37 has an outer end portion fitted to a through-bore 39 of the diff case 19 and fixedly retained with a threaded rod 41 for non-rotation and non drop-off. Since the rod 41 is formed with a thread, the rod 41 can be easily pulled out and provides ease of assembly of the pinion shaft 37 and pullout (placement to an outside) of the same. Moreover, the side gears 11, 13 have spline portions 43, 45 to which output shaft 47, 49 are coupled in spline connection. The side gears 11, 13 and the output shafts 47, 49 are positioned with a C-clip, and recesses 51, 53 formed on an inner peripheries of the side gears 11, 13, in fixed places (for non drop-off) with respect to the axial direction.

The differential limiting device 17 includes the electromagnetic actuators 29, a dog clutch 55, a return spring 57, and a controller.

The dog clutch 55 includes mating teeth 59 formed on the clutch ring (clutch member) 63 axial-movably disposed inside the diff case 19 on a side axially closer to the actuator 29; and mating teeth 61 formed on a ring, unitarily joined to a rear side of a gear portion of the first side gear 11 by welding, in opposition to the mating teeth 59 in the axial direction. The clutch ring 63 has leg portions 65 that are axial-movably placed within a through-bore 67 of the diff case 19 in non-rotation. As shown in the lower half of FIG. 1, as the clutch ring 63 moves rightward, the dog clutch 55 is brought into meshing engagement. As shown in the upper half of FIG. 1, as the clutch ring 63 moves leftward, the dog clutch 55 is uncoupled. There is located a return spring 57 between the left side gear 11 (mating teeth 61) and the clutch ring 63 (mating teeth 59) to urge the clutch ring 63 in a direction (leftward) to uncouple the dog clutch 55.

The diff case 19 has an opening 69 in a shape drawn in a two-dot chain line that permits assembling internal component parts (such as the members 15, 55, 57, 61, 63). That is, the diff case 19 takes a one-piece structure.

As set forth above, the electromagnetic actuator 29 is made up of the electromagnetic solenoid 25, the coil housing 71 covering the electromagnetic solenoid 25, and the plunger 27. The coil housing 71, the plunger 27, and the diff case 19 are made of magnetic material (for instance, JISS10C) and these members allow the electromagnetic solenoid 25 to form the magnetic flux loop (magnetic flux path) 24. The coil housing 71 (electromagnetic solenoid 25) is non-rotatably supported on the carrier 3 by means of a support member 73 and placed on the diff case 19 so as not to relatively mode for the diff case 19.

The plunger 27 includes a guide member 75, made of non-magnetic material such as stainless steel, which is disposed on the outer periphery of the left boss portion 31, and a plunger body 77 integrally attached to an outer periphery of the guide member 75. The guide member 75 is axial-movably supported on the outer periphery of the left boss portion 31 (diff case 19). The guide member 75 has a distal end portion 79 adapted to press end faces 26 of the leg portions 65 of the clutch ring 63 via the through-bore 67 formed in the sidewall 20.

As the controller (not shown) outputs a command to allow a battery to supply electric current to the coil 22 via a lead wire, the electromagnetic solenoid 25 is energized. Then, a magnetic flux loop is generated along the coil housing 71, the plunger body 77, the protruding portions 72 formed on the diff case 19 at the sidewall 20 thereof in a protruding pattern with a circumferential length, and the sidewall 20 of the diff case 19. Due to the resultant magnetic force, the plunger 27 (plunger body 77) moves rightward to press the clutch ring 63, thereby causing the dog clutch 55 to be brought into coupled condition to lock the differential action of the differential mechanism 15. When this takes place, a minimal clearance is formed between a distal end of the plunger 27 and the concave portion 72, and hence, the magnetic flux loop is kept to allow the clutch ring 63 to be maintained in an operative state in a reliable manner. Moreover, as the electromagnetic solenoid 25 is de-energized, the return spring 57 uncouples the dog clutch 55 and unlocks the differential action of the differential mechanism 15.

[Effects of Clutch Device 2 and Rear Diff 1]

With the present embodiment, the use of the carrier 3 supporting the coil housing 71 (electromagnetic solenoid 25) to allow a part (sidewall 20) of the diff 5 case 19 to play a role as a part of the magnetic flux path of the electromagnetic solenoid 25 results in the miniaturization of the electromagnetic actuator 29. As a result, the differential device (rear diff 1) can also be miniaturized in structure with the resultant increase in a variety of models (of differential devices) to which the electromagnet type actuator 29 is applied. In addition, the provision of the plunger 27 supported on the diff case 19 allows the diff case 19 and the plunger 27 to have an increased degree of concentricity, resulting in improved supporting capability and workability.

With the present embodiment, further, the electromagnetic actuator 29 has no interference with the bearing 33 even if the electromagnetic actuator 29 is placed in the area closer to the ring gear 21 of the diff case 19. This provides a further increase in a variety of models (of differential devices) to which the electromagnetic actuator is applied. Also, no interference relative to the ring gear 21 occurs even if the pinion shaft 37 is shifted in a direction to be pulled out. This makes it possible for the positioning actions of the output shafts 47, 49 to be maintained.

With the present embodiment, furthermore, due to the miniaturization of the electromagnetic clutch 29 (rear diff 1), no need arises for providing offset between the differential mechanism 15 and the whole of the rear diff 1 involving the electromagnetic actuator 29, or the amount of offset can be minimized. Accordingly, this minimizes a drop in compatibility of component parts such as the output shafts 47, 49 and the carrier 3.

With the present embodiment, moreover, since the clutch device 2 (differential limiting device 17 and electromagnetic actuator 29) is arranged in such a way to prevent the electromagnetic solenoid 25 from relative displacement in the axial direction with respect to one component part (diff case 19 in the present case) of the diff case 19 or the side gear 11 while permitting the diff case 19 to play a role as a part of the magnetic flux path generated by the electromagnetic solenoid 25. This allows a magnetic flux-path forming component of the electromagnetic solenoid 25 and the one component to be shared, and thus the electromagnet type actuator 29 is minimized in structure to that extent, enabling the miniaturization of the whole of the differential limiting device 17.

Second Embodiment

Figure 2:
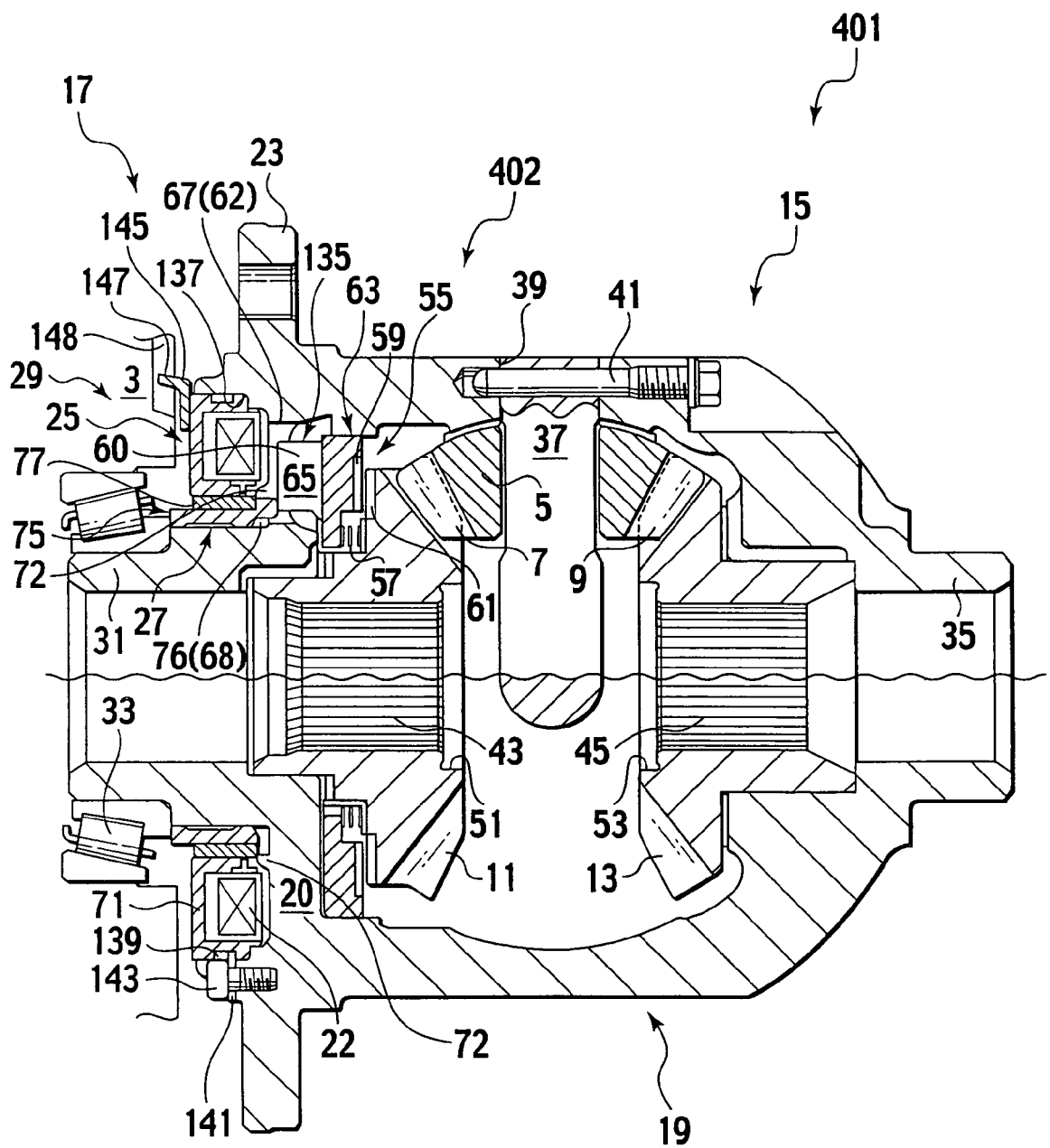
FIG. 2 is a cross-sectional view, taken on line D-D of FIG. 5, which shows a rear diff of a second embodiment under a free state of differential action.
Figure 3:
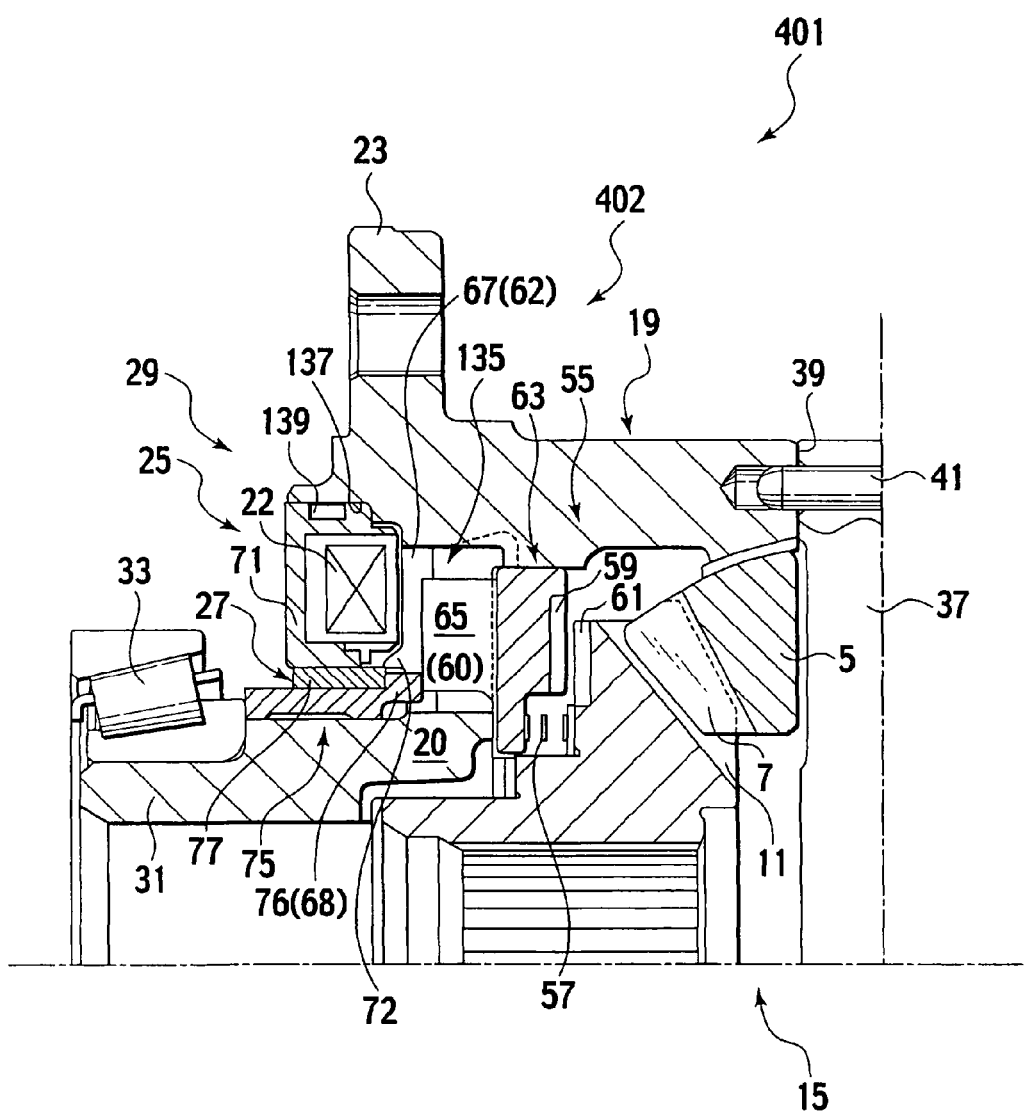
FIG. 3 is an enlarged view of an essential part shown in FIG. 2.
Figure 4:
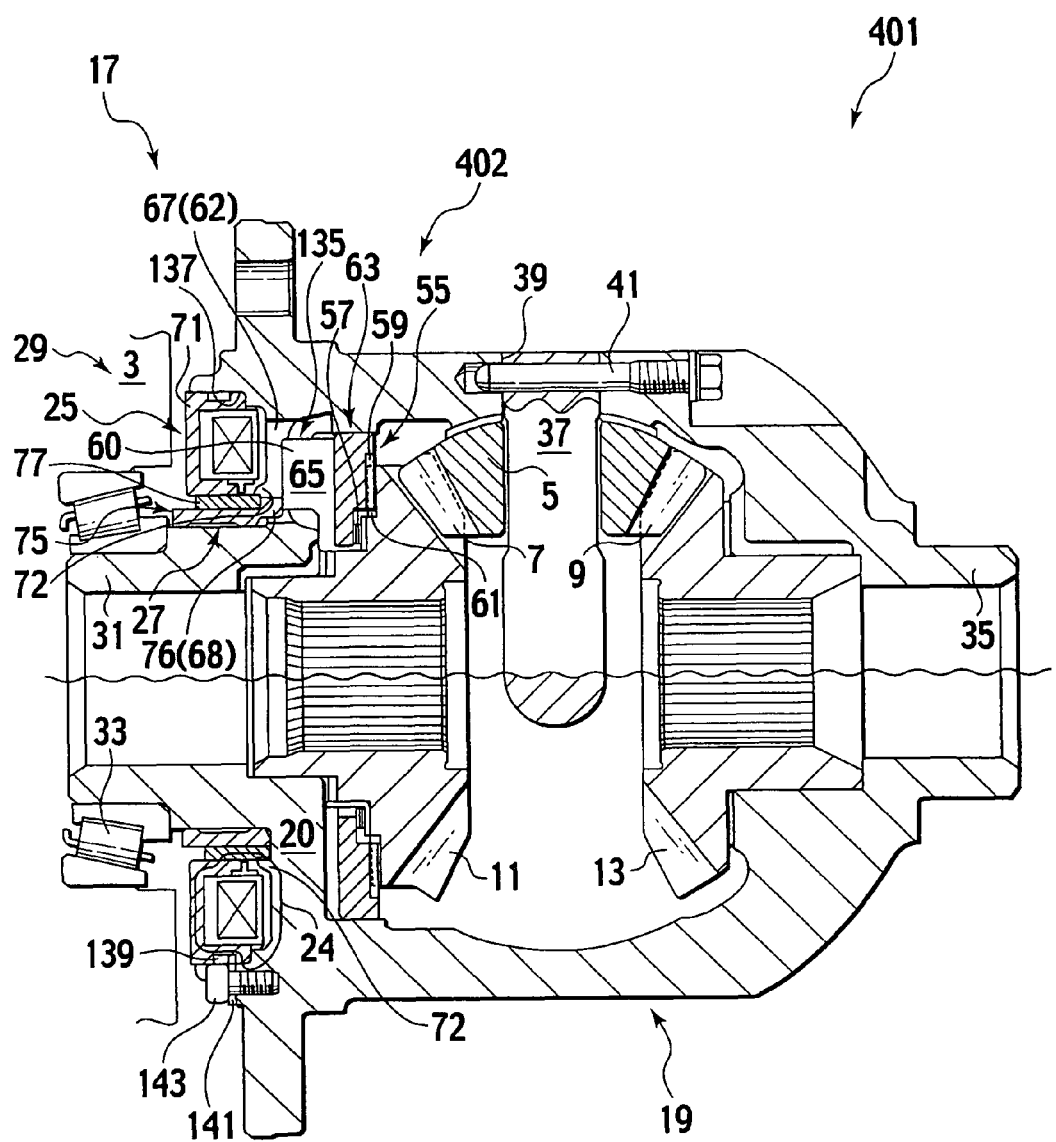
FIG. 4 is a cross-sectional view, taken on line D-D of FIG. 5, which shows the rear diff of the second embodiment under a locked state of differential action.

There will be explained a clutch device 402 of a second embodiment and a differential device (rear diff 401) using the clutch device 402 with reference to FIGS. 2 to 7. FIG. 2 is a cross-sectional view, taken on line D-D of FIG. 5, which shows the rear diff 401 under a free state of differential action. Likewise, FIG. 4 is a cross-sectional view, taken on line D-D of FIG. 5, which shows the rear diff 401 under a locked state of differential action. In the following description, the term "lateral direction" represents a transverse direction of a 4WD vehicle on which the rear diff 401 is employed.

[Features of Clutch Device 402 and Rear Diff 401]

The clutch device 402 includes the diff case (an input member) 19 rotatable in response to applied drive torque; the pair of side gears (output members) 11, 13 to which drive torque is transferred from the diff case 19; the clutch ring (clutch member) 63 held in constant connection to one member (for instance, the diff case 19) of the diff case 19 or the pair of side gears 11, 13 and operative to move toward the other member (for instance, the side gears 11, 13) in an axial direction for intermittent connection thereto; and the electromagnetic actuator 29 operative to axially move the clutch ring 63.

The rear diff 401, employing the clutch device 402, is accommodated in a carrier 3 (see FIG. 1). The rear diff 401 includes the diff case (input member) 19 rotatable in response to applied drive torque; the rotatable pinion gear (differential member) 5; the pair of side gears (output members) 11, 13 held in meshing engagement (in connection for relative rotation with respect to each other) with the pinion gear 5 via mating portions (torque transfer portions) 7, 9 to deliver drive torque; the differential mechanism 15 rotatable in concentric relation with the diff case 19; and the differential limiting device 17 for limiting the differential rotation of the differential mechanism 15.

The differential limiting device 17 includes the electromagnet type actuator 29 operative to move the clutch ring (clutch member) 63 to control a differential limiting function of the differential mechanism 15 and the input member includes the diff case 19 in which the differential mechanism 15 is accommodated. The diff case 19 includes the flange (flange portion) 23 to which the ring gear 21 is fixedly mounted to deliver drive torque from the engine.

The electromagnet type actuator 29 includes an electromagnetic solenoid 25, and a plunger 27 operative to axially move in response to magnetic force generated by the electromagnetic solenoid 25 to axially shift the clutch ring 63. The electromagnetic solenoid 25 is mounted on the diff case 19 so as not to relatively displace the diff case 19 in the axial direction, and the diff case 19 forms a part of the magnetic flux path generated by the electromagnetic solenoid 25. The electromagnetic solenoid 25 is disposed on one side (leftward in FIG. 1) of the diff case 19 in the area closer to the ring gear 21 and non-rotatably fixed to the carrier 3. Moreover, the diff case 19 has the sidewall 20 that forms a part of the magnetic flux path of the electromagnetic solenoid 25, and the plunger 27 is supported on the outer periphery of the boss portion 31 of the diff case 19.

Figure 6:
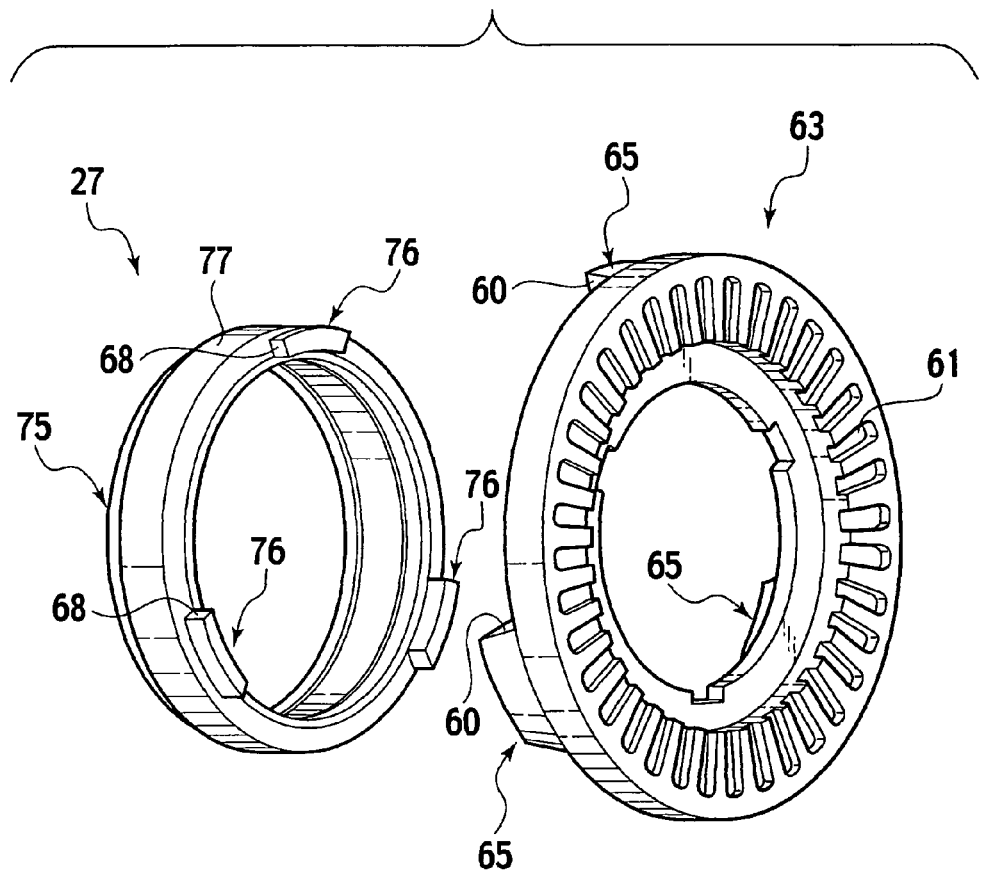
FIG. 6 is a perspective view showing a plunger and a clutch ring of the second embodiment as viewed in one direction.
Figure 7:
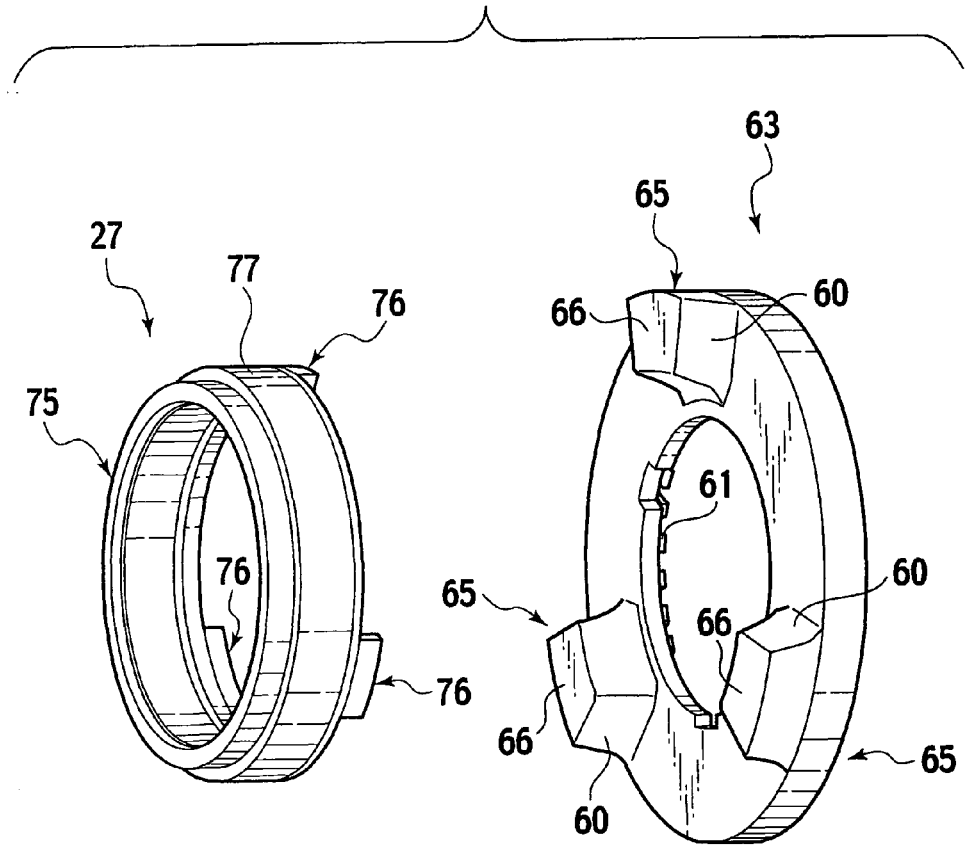
FIG. 7 is a perspective view showing the plunger and the clutch ring of the second embodiment as viewed in the other direction.

The flange 23 is formed on the diff case 19 at one side (left side) thereof in an axially offset position, and the electromagnet type actuator 29 is placed adjacent to the flange 23. The plunger 27, made of magnetic material, includes the plunger body 77, which is subject to magnetic force, and the guide member 75, made of non-magnetic material, which is fixedly secured to the inner periphery of the plunger body 77. As shown in FIGS. 6 and 7, the guide member 75 has three protruding portions 76 formed at equidistantly spaced positions in a circumferential direction. The protruding portions 76 pass through the through-bore 67 of the diff case 19 to be brought into abutting engagement with a left sidewall 66 (see FIG. 7) to position the clutch ring 63 in the axial direction.

[Structures of Clutch Device 402 and Rear Diff 401]

With the present embodiment, the clutch device 402 is employed as the differential limiting device 17 that combines (locks) the side gear 11 and the diff case 19.

The differential limiting device 17 includes the electromagnet type actuator 29, the dog clutch 55, the return spring 57, and the controller.

Figure 5:
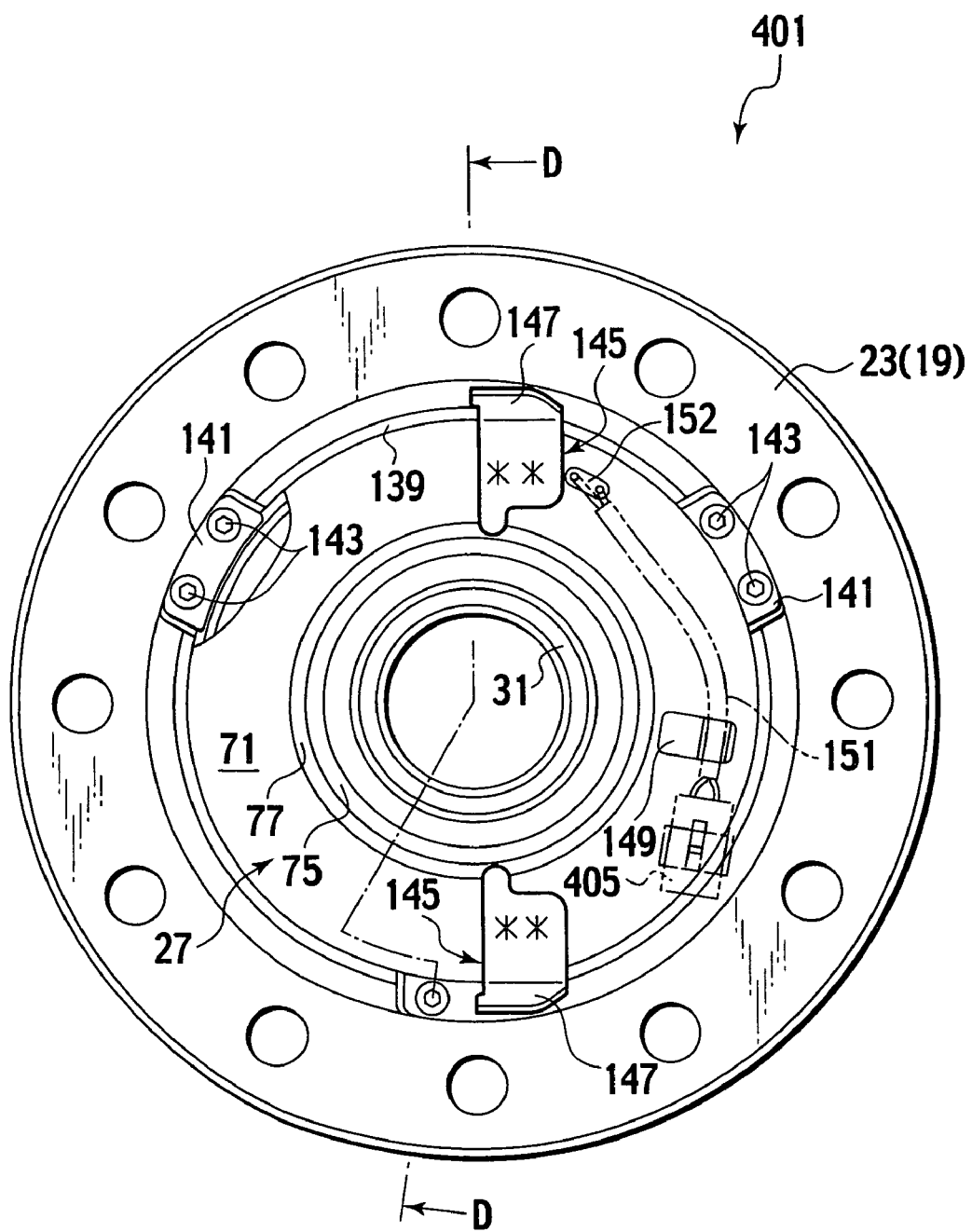
FIG. 5 is a view of the rear diff as viewed from a clutch housing of the second embodiment.

The electromagnetic solenoid 25 (coil housing 71) of the electromagnetic actuator 29 is radially supported with a retainer portion 137 of the diff case 19 and slides within the retainer portion 137 with relative rotation capability with respect to the diff case 19. As shown in FIG. 5, two stopper members 145 are joined to the coil housing 71 at circumferentially equidistantly spaced positions by spot welding. The stopper members 145 have distal end portions 147 held in engagement with concave portions 148 (see FIG. 8) formed on the carrier 3 to non-rotatably support the electromagnetic solenoid 25 in the axial direction. A clip 149 is fixedly attached to the coil housing 71. The electromagnetic solenoid 25 has a lead wire 151 that is extracted through a hermetically-sealed cap 152, made of rubber, from the coil housing 71, fixedly placed onto the coil housing 71 by means of the clip 149 and further extracted to an outside of the carrier 3 by means of a connector 405 or the like for connection to a battery.

The dog clutch 55 includes the mating teeth 59 formed on the clutch ring 63 and the mating teeth 61 formed on the left side gear 11. The clutch ring 63 is axial-movably supported on the inner periphery of the diff case 19. As shown in FIGS. 6 and 7, the three leg portions 65, formed on the clutch ring 63 at the circumferentially equidistantly spaced positions thereof, are non-rotatably held in engagement with the through-bore 67 of the diff case 19. As the electromagnetic solenoid 25 is energized to move the plunger 27 rightward, the protruding portions 75 of the guide member 75 press the leg portions 63 of the clutch ring 63, respectively, to cause the dog clutch 55 to be coupled.

There is formed a cam 135 in a space between the leg portions 65 and the through-bore 67 and operative in response to drive torque to press the clutch ring 63 in a direction (rightward) to cause the dog clutch 55 to be coupled. The cam 135 includes cam surfaces 60, 60, 62, 62 formed on surfaces, facing in a rotational direction, of the leg portions 65 of the clutch ring 63 and the through-bore 67 at the same slant angles to urge the clutch ring 63 in a direction (rightward) to cause the dog clutch 55 to be coupled. The return spring 57 is located between the clutch ring 63 and the left side gear 11 thereby urging clutch ring 63 in a direction (leftward) to uncouple the dog clutch 55.

As shown in FIG. 6, the guide member 75 of the plunge 27 has rotationally-directed surfaces 68 at which the guide member 75 is supported in non relative rotation with rotationally-directed surfaces 62 of the through-bore 67 while the guide member 75 is relatively rotatable to the electromagnetic solenoid 25.

The through-bore 67 has an axially center brim portion (in an area closer to the protruding portions 76 of the guide member 75) formed with protruding portions 72 each with a circumferential length to permeate magnetic field lines through the plunger 27. With such a structure, when the plunger 25 is caused to axially move due to magnetic force generated by the electromagnetic solenoid 25, the plunger 27 is placed in opposition to the protruding portions 72 with a minimal clearance in a radial direction. Also, while it may be preferable for the protruding portions 72 to be annular in shape, the protruding portions 72 is formed with the through-bore 67 in duplication in the present embodiment wherein the through-bore 67 takes an annular configuration that is partly cut out in a circumferential direction. Therefore, a need arises for the protruding portion 72 to have at least a given circumferential length to permeate the magnetic field lines.

The guide member 75, made of non-magnetic material, preclude magnetic fluxes generated by the electromagnetic solenoid 25 from leaking to the diff case 19. In addition, the electromagnetic solenoid 25 is supported with the retainer portion 137 in contact with the diff case 19 in opposition to the diff case 19 in the radial direction thereof and supported on the diff case 19 by means of plates 141 and bolts 142 in the axial direction. This results in less fluctuation in magnetic fluxes that permeate through the diff case 19, enabling the dog clutch 55 to have stable actuating function.

As shown in FIG. 4, as the electromagnetic solenoid 25 is energized, a magnetic flux loop 24 is generated. This causes the plunger 27 to move rightward to cause the dog clutch 55 to be coupled, thereby locking the differential action of the differential mechanism 15. Concurrently, the cam 135 is actuated to press the clutch ring 63 rightward, thereby preventing the undesired uncoupling of the dog clutch 55. Also, as the electromagnetic solenoid 25 is de-energized, the return spring 57 urges the plunger 27 to return leftward, thereby uncoupling the dog clutch 55 while releasing the differential lock.

[Effects of Clutch Device 402 and Rear Diff 401]

With the present embodiment, the use of the carrier 3 supporting the coil housing 71 (electromagnetic solenoid 25) to allow a part (sidewall 20) of the diff case 19 to play a role as a part of a magnetic flux path of the electromagnetic solenoid 25 results in the miniaturization of the electromagnetic actuator 29. As a result, the differential device (rear diff) 401 can also be miniaturized in structure with the resultant increase in a variety of models (of differential devices) to which the electromagnet type actuator 29 is applied. In addition, the provision of the plunger 27 (guide member 75) supported on the diff case 19 allows the diff case 19 and the plunger 27 to have an increased degree of concentricity, resulting in improved supporting capability and workability.

With the present embodiment, further, the electromagnetic actuator 29 has no interference with the bearing 33 even if the electromagnet type actuator 29 is placed in the area closer to the ring gear 21 of the diff case 19. This provides a further increase in a variety of models (of differential devices) to be mounted.

With the present embodiment, furthermore, due to the miniaturization of the electromagnet type clutch 29 (rear diff 401), no need arises for providing offset between the differential mechanism 15 and the whole of the rear diff 401 involving the electromagnet type actuator 29, or the amount of offset can be minimized. Accordingly, this minimizes a drop in compatibility of component parts such as the output shafts (drive shafts), through which the side gears 11, 13 and the rear wheels are connected, and the carrier 3.

With the present embodiment, moreover, since the electromagnet type actuator 29 is placed adjacent to the flange 23 formed on the diff case 19 at a position axially off set to the leftward area of the diff case 19, a distance between the axis center of the pinion shaft 37 and a side end portion of the right boss portion 35 is narrowed by such extent in contrast to the structure of the related art. Accordingly, this distance can be easily matched to a dimension required for the output shaft to be connected to the side gears 11, 13, resulting in further increases in layout applicability around the rear diff 401 and installation capability to a vehicle.

With the present embodiment, additionally, the placement of the electromagnet type actuator 29 in an area closer to the flange 23 of the diff case 19 allows the plunger 27 and the dog clutch 55 to be also located in an area closer to the flange 23. Accordingly, the through-bore 67 can also be formed in the diff case 19 with the resultant reduction in a wasteful thickened wall of the diff case 19 in an area closer to the flange 23, thereby achieving a structure with lightweight.

With the present embodiment, also, the plunger 27 includes the plunger body 77 made of magnetic material and the guide member 75 made of non-magnetic material to allow the clutch ring 63 to be brought into abutting contact with the guide member 75 for achieving the positioning in the axial direction, thereby precluding clearances among these component parts. Consequently, no need arises for the electromagnetic solenoid 25 to be formed with a large size in structure for the purpose of increasing a stroke.

Further, with the present embodiment, no positioning of the clutch ring 63, playing a role as a strengthening member (magnetic member), is made on the diff case 19 in contrast to the structure of the related art, thereby precluding the clutch ring 63 from being magnetized due to leakage flux while preventing the clutch ring 63 from being stick to the diff case 19 and precluding adverse affect from acting on the operation of the differential limiting device 17.

Accordingly, no need arises for sizing up the electromagnet type actuator 29 to reduce leakage flux or the sucking force of the clutch ring 63 to the diff case 19, or to increase the actuating force of the electromagnet type actuator 29 (electromagnetic solenoid 25). This improves the installation capability of the electromagnet type actuator 29, cost performance, and power saving.

Furthermore, with the present embodiment, the electromagnetic solenoid 25 can also be miniaturized in structure, a variety of the layout of the electromagnetic solenoid 25 van be expanded, and the number of turns, weight, and cost of the coil can be reduced.

Moreover, with the present embodiment, since the differential limiting device 17 (dog clutch 55) is located between the side gear 11 and the clutch ring 63 in engagement with the diff case 19, the diff case 19 can take a simple one-piece structure with lightweight, in contrast to the structure of the related art. Thus the diff case 19 does not need to be separated into two pieces for the purpose of assembling an inner diff case into an interior of the diff case 19, thereby preventing the resulting remarkable increase in cost. In addition, no need arises for sizing down the gears 5, 11, and 13, forming the differential mechanism 15, for the purpose of avoiding interference with the inner diff case. This avoids a drop in torque capacity and therefore no need arises for increasing the number of pinion gears 5 for compensating the drop in torque capacity. Accordingly, the resulting increase in weight can be prevented.

With the present embodiment, also, the use of the plate 14 and the bolts 143 enables the electromagnetic solenoid 25 to be axially supported on the diff case 19. This provides further improvement in the above-described unifying effect between the electromagnetic solenoid 25 and the diff case 19.

With the present embodiment, further, the through-bore 67 has a side edge portion (on a side closer to the protruding portion 76 of the guide member 75) at an area near an axial center formed with the protruding portions 72 having a circumferential length for permeating magnetic field lines to the plunger 27.

Third Embodiment

Figure 8:
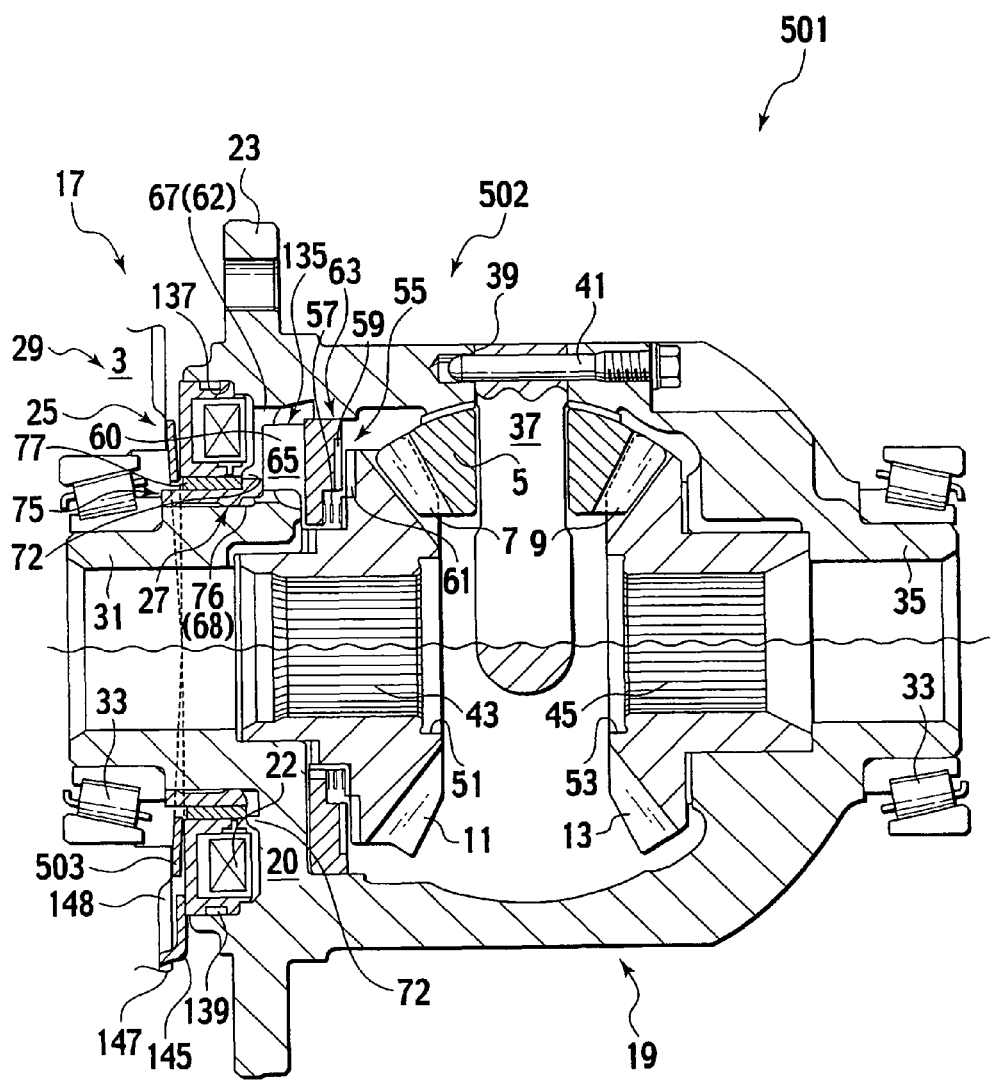
FIG. 8 is a cross-sectional view showing a rear diff of a third embodiment under a free state of differential action.

There will be explained a clutch device 502 and a differential device (rear diff) 501 employing the clutch device 502 with reference to FIG. 8. FIG. 8 shows the rear diff 501 under a free differential mode. In the following description, the term "lateral direction" represents a transverse direction of a 4WD vehicle in which the rear diff 501 is employed.

[Features of Clutch Device 502 and Rear Diff 501]

The clutch device 502 includes the diff case (input member) 19 rotatable in response to applied drive torque; the pair of side gears (output members) 11, 13 to which drive torque is transferred from the diff case 19; the clutch ring (clutch member) 63 held in constant connection to one member (for instance, the diff case 19) of the diff case 19 or the pair of side gears 11, 13 and operative to move toward the other member (for instance, the pair of the side gears 11, 13) in an axial direction for intermittent connection thereto; and the electromagnetic actuator 29 operative to axially move the clutch ring 63.

The rear diff 501, employing the clutch device 502, is accommodated in the carrier 3 (see FIG. 1). The rear diff 501 includes the diff case (input member) 19 rotatable in response to applied drive torque; the rotatable pinion gear (differential member) 5; the pair of side gears (output members) 11, 13 held in meshing engagement (in connection for relative rotation with respect to each other) with the pinion gear 5 via mating portions (torque transfer portions) 7, 9 to deliver drive torque; the differential mechanism 15 rotatable in concentric relation with the diff case 19; and the differential limiting device 17 for limiting the differential rotation of the differential mechanism 15.

The differential limiting device 17 includes the electromagnet type actuator 29 operative to move a clutch ring 63 to control the differential limiting function of the differential mechanism 15 and the input member includes the diff case 19 in which the differential mechanism 15 is accommodated. The diff case 19 includes the flange (flange portion) 23 to which the ring gear 21 (see FIG. 1) is fixedly mounted to deliver drive torque from the engine.

The electromagnet type actuator 29 includes the electromagnetic solenoid 25, and the plunger 27 operative to axially move in response to magnetic force generated by the electromagnetic solenoid 25 to axially shift the clutch ring 63. The electromagnetic solenoid 25 is mounted on the diff case 19 so as not to relatively displace the diff case 19 in the axial direction, and the diff case 19 forms a part of the magnetic flux path generated by the electromagnetic solenoid 25. The electromagnetic solenoid 25 is disposed on one side (leftward in FIG. 8) of the diff case 19 in an area closer to the ring gear 21 and non-rotatably fixed to the carrier 3. Moreover, the diff case 19 has the sidewall 20 that forms a part of the magnetic flux path of the electromagnetic solenoid 25, and the plunger 27 is supported on the outer periphery of the boss portion 31 of the diff case 19.

The flange 23 is formed on the diff case 19 at one side (left side) thereof in an axially offset position, and the electromagnet type actuator 29 is placed adjacent to the flange 23. The plunger 27, made of magnetic material, includes the plunger body 77, which is subject to magnetic force, and the guide member 75, made of non-magnetic material, which is fixedly secured to the inner periphery of the plunger body 77. The guide member 75 has three protruding portions 76 formed at equidistantly spaced positions in a circumferential direction. The protruding portions 76 pass through the through-bore 67 of the diff case 19 to be brought into abutting engagement with the left sidewalls 66 (see FIG. 7) of the leg portions 65 of the clutch ring 63 to position the clutch ring 63 in the axial direction.

[Structures of Clutch Device 502 and Rear Diff 501]

In FIG. 8, also, the same functioning portions and functioning members as those of the rear diff 401 (of the second embodiment) bear like reference numerals to omit duplicate description.

With the present embodiment, the clutch device 502 is used as the differential limiting device 17.

While, with the rear diff 401, the electromagnetic solenoid 25 is supported with the diff case 19 by means of the plate 141 and the bolts 143 in the axial direction, the rear diff 501 has an axially supporting function that is performed with a leaf spring 503.

The leaf spring 503 is a semicircular ring, which is placed between the carrier 3 and the solenoid 25. The leaf spring 503 has a central portion attached to the coil housing 71 of the electromagnetic solenoid 25 by spot welding, and both end portions held in contact with the carrier 3 for flexing. Additionally, the leaf spring 503 has an urging force to press the electromagnetic solenoid 25 toward the diff case 19, thereby permitting the electromagnetic solenoid 25 to be supported on the diff case 19 in the axial direction.

The electromagnetic solenoid 25 allows a support portion 137 to be held in contact with the diff case 19 in opposition thereto in the radial direction and is pressed against the diff case 19 by means of the leaf spring 503. Thus, magnetic fluxes permeating through the diff case 19 have less fluctuation and therefore the operation of the dog clutch 55 becomes stable.

Also, the leaf spring 503 may not be fixed to the electromagnetic solenoid 25 but to the carrier 3.

[Effects of Clutch Device 502 and Rear Diff 501]

With the present embodiment, the use the carrier 3 supporting the coil housing 71 (electromagnetic solenoid 25) to allow a part (sidewall 20) of the diff case 19 to play a role as a part of a magnetic flux path of the electromagnetic solenoid 25 can miniaturize the electromagnetic actuator 29. As a result, the differential device (rear diff) 501 can also be miniaturized in structure with the resultant increase in a range of models (of differential devices) to which the electromagnetic actuator 29 is applied. In addition, the provision of the plunger 27 (guide member 75) supported on the diff case 19 allows the diff case 19 and the plunger 27 to have an increased degree of concentricity, resulting in improved supporting capabilities and workability.

With the present embodiment, further, the electromagnetic actuator 29 has no interference with the bearing 33 even if the electromagnetic actuator 29 is placed in the area closer to the ring gear 21 of the diff case 19. This provides a further increase in a variety of models (of differential devices) to which the electromagnetic actuator is applied.

With the present embodiment, further, due to the miniaturization of the electromagnetic actuator 29 (rear diff 501), no need arises for an offset between the differential mechanism 15 and the whole of the rear diff 501, involving the electromagnetic actuator 29, or the amount of offset can be minimized.

With the present embodiment, furthermore, the electromagnetic clutch 29 is paced adjacent to the flange 23 formed on the diff case 19 at a position axially offset to the leftward area of the diff case 19, a distance between an axial center of the pinion shaft 37 and a side end portion of the right boss portion 35 is narrowed by such extent in contrast to the structure of the related art. Accordingly, this distance can be easily matched to demanded dimensions of the output shafts to which the side gears 11, 13 are connected, providing further improvement in layout applicability around the rear diff 501 and installation capability to a vehicle.

With the present embodiment, moreover, the placement of the electromagnet type actuator 29 in an area adjacent to the flange 23 of the diff case 19 allows the plunger 27 and the dog clutch 55 to be placed in an area closer to the flange 23. Accordingly, the diff case 19 is formed with the through-bore 67 to allow the omission of wasteful thickened wall of the flange 23 thereby permitting the diff case 19 to have lightweight by that extent.

With the present embodiment, also, the plunger 27 includes the plunger body 77 made of magnetic material and the guide member 75 made of non-magnetic material to allow the clutch ring 63 to be brought into abutting contact with the guide member 75 for achieving the positioning in the axial direction, thereby precluding clearances among these component parts. Consequently, no need arises for the electromagnetic solenoid 25 to be formed with a large size in structure for the purpose of increasing a stroke.

Further, with the present embodiment, no positioning of the clutch ring 63, playing a role as a strengthening member (magnetic member), is made on the diff case 19 in contrast to the structure of the related art, thereby precluding the clutch ring 63 from being magnetized due to leakage flux while preventing the clutch ring 63 from being stick to the diff case 19 and precluding adverse affect from acting on the operation of the differential limiting device 17.

Accordingly, no need arises for sizing up the electromagnet type actuator 29 to reduce leakage flux, the sucking force of the clutch ring 63 to the diff case 19, or increase the actuating force of the electromagnet type actuator 29 (electromagnetic solenoid 25). This improves in the installation capability of the electromagnet type actuator 29, cost performance, and power saving.

Furthermore, with the present embodiment, the electromagnetic solenoid 25 can also be miniaturized in structure, a variety of the layout of the electromagnetic solenoid 25 can be expanded, and the number of turns, weight, and cost of the coil can be reduced.

Moreover, with the present embodiment, since the differential limiting device 17 (dog clutch 55) is located between the side gear 11 and the clutch ring 63 in engagement with the diff case 19, the diff case 19 can take a simple one-piece structure with lightweight, in contrast to the structure of the related art. Thus, the diff case 19 does not need to be separated into two pieces for the purpose of assembling an inner diff case into an interior of the diff case 19, thereby preventing the resulting remarkable increase in cost. In addition, no need arises for sizing down the gears 5, 11, and 13, forming the differential mechanism 15, for the purpose of avoiding interference with the inner diff case. This avoids a drop in torque capacity and therefore no need arises for increasing the number of pinion gears 5 for compensating the drop in torque capacity. Accordingly, the resulting increase in weight can be prevented.

With the present embodiment, also, the use of the leaf spring 503, by which the electromagnetic solenoid 25 is pressed against and axially supported on the diff case 19, results in further improvement in the above-described unifying effect between the electromagnetic solenoid 25 and the diff case 19.

Fourth Embodiment

Figure 9:
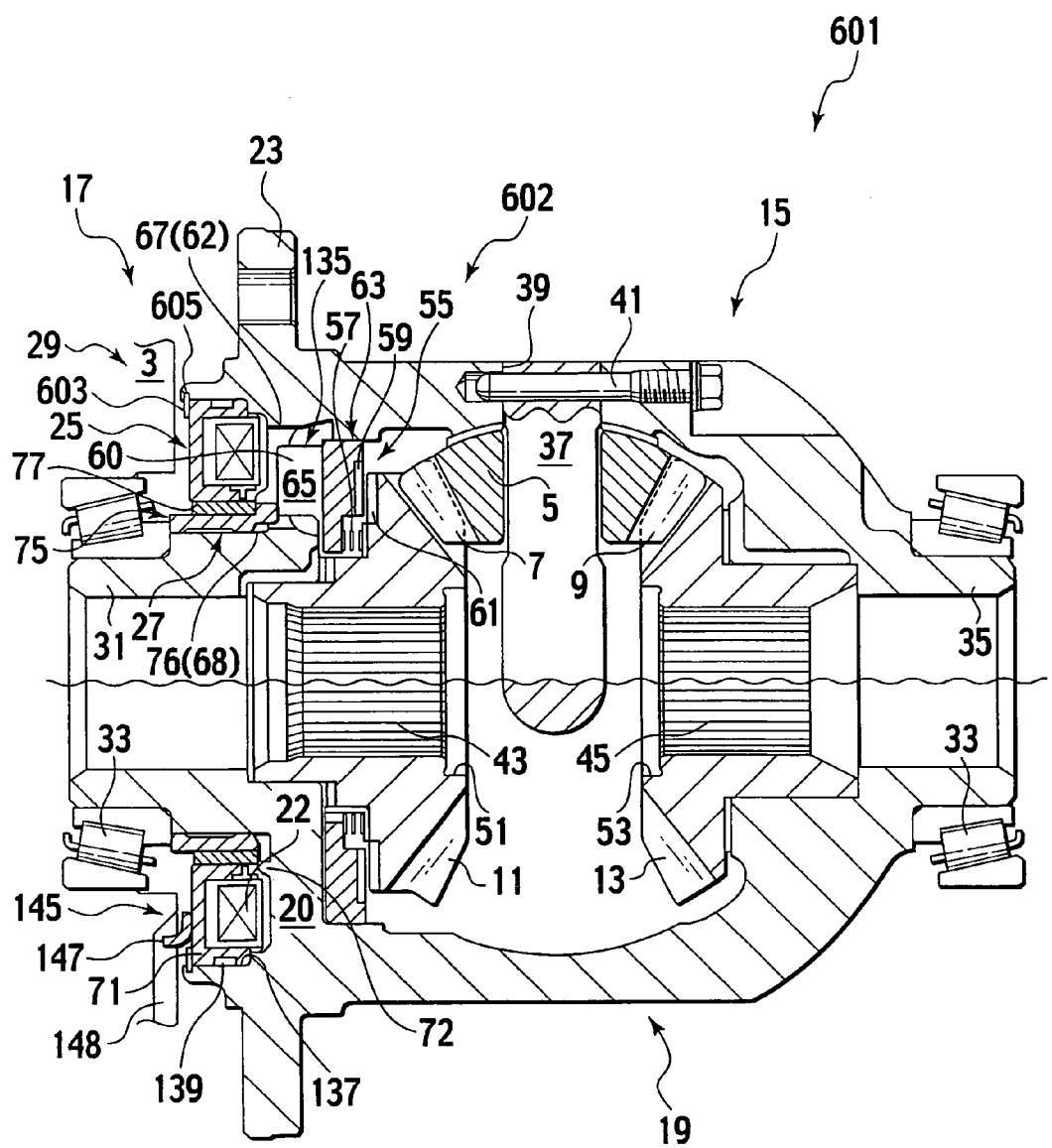
FIG. 9 is a cross-sectional view, taken on line E-E of FIG. 10, which shows a rear diff of a fourth embodiment under a free state of differential action.

There will be explained a clutch device 602 and a differential device (rear diff) 601 employing the clutch device 602 with reference to FIGS. 9 and 10. FIG. 9 is a cross-sectional view taken on line E-E of FIG. 10 and shows the rear diff 601 under differential action in a free state. In the following description, the term "lateral direction" represents a transverse direction of a 4WD vehicle in which the rear diff 601 is employed.

[Features of Clutch Device 602 and Rear Diff 601]

The clutch device 602 includes the diff case (input member) 19 rotatable in response to applied drive torque; the pair of side gears (output members) 11, 13 to which drive torque is transferred from the diff case 19; the clutch ring (clutch member) 63 held in constant connection to one member (for instance, the diff case 19) of the diff case 19 or the pair of side gears 11, 13 and operative to move toward the other member (for instance, the pair of the side gears 11, 13) in an axial direction for intermittent connection thereto; and the electromagnetic actuator 29 operative to axially move the clutch ring 63.

The rear diff 601, employing the clutch device 602, is accommodated in the carrier 3 (see FIG. 1). The rear diff 601 includes the diff case (input member) 19 rotatable in response to applied drive torque (drive power delivered from the engine); the rotatable pinion gear (differential member) 5; the pair of side gears (output members) 11, 13 held in meshing engagement (in connection for relative rotation with respect to each other) with the pinion gear 5 via mating portions (torque transfer portions) 7, 9 to deliver drive torque; the differential mechanism 15 rotatable in concentric relation with the diff case 19; and the differential limiting device 17 for limiting the differential rotation of the differential mechanism 15.

The differential limiting device 17 includes the electromagnet type actuator 29 operative to move the clutch ring 63 to control the differential limiting function of the differential mechanism 15 and the input member includes the diff case 19 in which the differential mechanism 15 is accommodated. The diff case 19 includes the flange (flange portion) 23 to which the ring gear 21 (see FIG. 1) is fixedly mounted to deliver drive torque from the engine.

The electromagnet type actuator 29 includes the electromagnetic solenoid 25, and the plunger 27 operative to axially move in response to magnetic force generated by the electromagnetic solenoid 25 to axially shift the clutch ring 63. The electromagnetic solenoid 25 is mounted on the diff case 19 so as not to relatively displace the diff case 19 in the axial direction, and the diff case 19 forms a part of the magnetic flux path generated by the electromagnetic solenoid 25. The electromagnetic solenoid 25 is disposed on one side (leftward in FIG. 9) of the diff case 19 in an area closer to the ring gear 21 and non-rotatably fixed to the carrier 3. The sidewall 20 of the diff case 19 forms a part of the magnetic flux path of the electromagnetic solenoid 25, and the plunger 27 is supported on the outer periphery of the boss portion 31 of the diff case 19.

The flange 23 is formed on the diff case 19 at one side (left side) thereof in an axially the offset position, and the electromagnet type actuator 29 is placed adjacent to the flange 23. The plunger 27, made of magnetic material, includes the plunger body 77, which is subject to magnetic force, and the guide member 75, made of non-magnetic material, which is fixedly secured to the inner periphery of the plunger body 77. The guide member 75 has the three protruding portions 76 formed at equidistantly spaced positions in the circumferential direction. The protruding portions 76 pass through the through-bore 67 of the diff case 19 to be brought into abutting engagement with the left sidewalls 66 (see FIG. 7) of the leg portions 65 of the clutch ring 63 to position the clutch ring 63 in the axial direction.

[Structures of Clutch Device 602 and Rear Diff 601]

Figure 10:
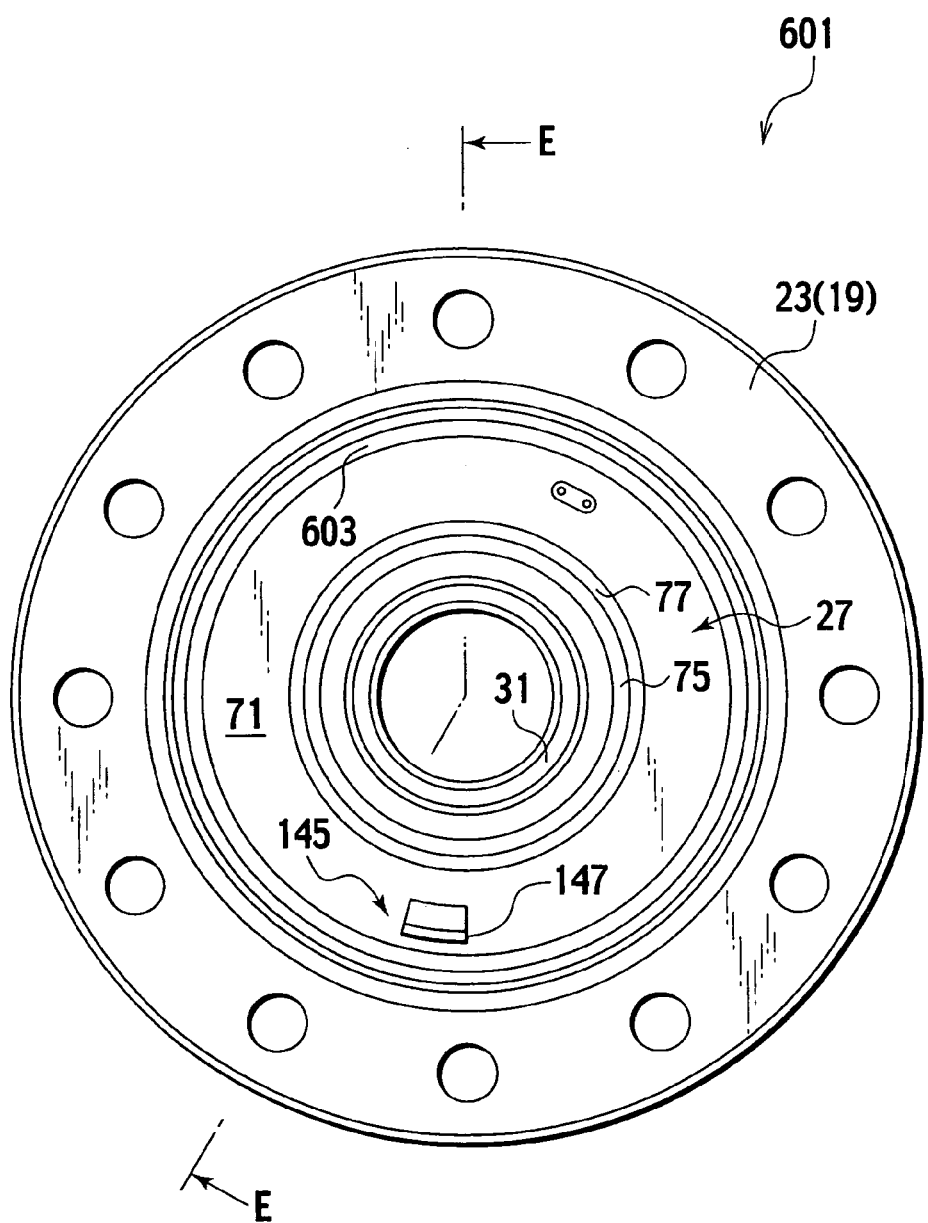
FIG. 10 is a view of the rear diff as viewed from the clutch housing of the fourth embodiment.

In FIGS. 9 and 10, also, the same functioning portions and functioning members as those of the rear diff 401 (of the third embodiment) bear like reference numerals to omit duplicate description.

With the present embodiment, the clutch device 602 is used as the differential limiting device 17.

While, with the rear diff 401, the electromagnetic solenoid 25 is supported with the diff case 19 by means of the plate 141 and the bolts 143 in the axial direction, the rear diff 601 has an axially supporting function that is performed with a snap ring 603.

The snap ring 603 is fitted to a circumferential recess 605 formed in the diff case 19. Under such a state, the snap ring 603 is brought into abutment with a left side wall of the electromagnetic solenoid 25 such that the electromagnetic solenoid 25 is axially supported on the diff case 19.

The electromagnetic solenoid 25 is held in contact with the diff case 19 in opposition thereto in a radial direction at the support portion 137 and axially supported on the diff case 19 by means of the snap ring 603. Thus, magnetic fluxes permeating through the diff case 19 has less fluctuation and therefore the operation of the dog clutch 55 becomes stable.

[Effects of Clutch Device 602 and Rear Diff 601]

With the present embodiment, the use of a structure in which the carrier 3 supports the coil housing 71 (electromagnetic solenoid 25) to allow a part (sidewall 20) of the diff case 19 to play a role as a part of a magnetic flux path of the electromagnetic solenoid 25 can miniaturize the electromagnetic actuator 29. As a result, the differential device (rear diff) 601 can also be miniaturized in structure with the resultant increase in a variety of models (of differential devices) to which the electromagnet type actuator 29 is applied. In addition, the provision of the plunger 27 (guide member 75) supported on the diff case 19 allows the diff case 19 and the plunger 27 to have an increased degree of concentricity, resulting in improved supporting capabilities and workability.

With the present embodiment, further, the electromagnet type actuator 29 has no interference with the bearing 33 even if the electromagnet type actuator 29 is placed closer to the ring gear 21 of the diff case 19. This provides a further increase in a variety of models (of differential devices) available to be installed.

With the present embodiment, furthermore, due to the miniaturization of the electromagnet type clutch 29 (rear diff 601), no need arises for an offset between the differential mechanism 15 and the whole of the rear diff 601, involving the electromagnet type actuator 29, or the amount of offset can be minimized. Accordingly, this results in minimizing a decrease in replacement capability of output shafts (drive shafts), through which the side gears 11, 13 and rear wheels are interconnected, and the carrier 3.

With the present embodiment, furthermore, since the electromagnet type clutch 29 is placed adjacent to the flange 23 formed on the diff case 19 at a position axially offset to the leftward position thereof, a distance between the axial center of the pinion shaft 37 and the side end portion of the right boss portion 35 is narrowed by that extent in contrast to the structure of the related art. Accordingly, this distance can be easily matched to demanded dimensions of the output shafts to which the side gears 11, 13 are connected, providing further improvement in layout applicability around the rear diff 601 and installation capability to a vehicle.

With the present embodiment, moreover, the placement of the electromagnet type actuator 29 placed adjacent to the flange 23 formed on the diff case 19 results in capability for the plunger 27 and the dog clutch 55 to be placed in an area closer to the flange 23. With such displacement, the diff case 19 is formed with the through-bore 67 to allow the omission of wasteful thickened wall of the flange 23 thereby permitting the diff case 19 to have lightweight by that extent.

With the present embodiment, also, the plunger 27 includes the plunger body 77 made of magnetic material and the guide member 75 made of non-magnetic material to allow the clutch ring 63 to be brought into abutting contact with the guide member 75 for achieving the positioning in the axial direction, thereby precluding clearances among these component parts. Consequently, no need arises for the electromagnetic solenoid 25 to be formed with a large size in structure for the purpose of increasing a stroke.

Further, with the present embodiment, no positioning of the clutch ring 63, playing a role as a strengthening member (magnetic member), is made on the diff case 19 in contrast to the structure of the related art, thereby precluding the clutch ring 63 from being magnetized due to leakage flux while preventing the clutch ring 63 from being stick to the diff case 19 and precluding adverse affect from acting on the operation of the differential limiting device 17.

Accordingly, no need arises for sizing up the electromagnet type actuator 29 to reduce leakage flux, the sucking force of the clutch ring 63 to the diff case 19, or increase the actuating force of the electromagnet type actuator 29. This improves in the installation capability of the electromagnet type actuator 29, cost performance, and power saving.

Furthermore, with the present embodiment, the electromagnetic solenoid 25 can also be miniaturized in structure, a variety of the layout of the electromagnetic solenoid 25 can be expanded, and the number of turns, weight, and cost of the coil can be reduced.

Moreover, with the present embodiment, since the differential limiting device 17 (dog clutch 55) is located between the side gear 11 and the clutch ring 63 in engagement with the diff case 19, the diff case 19 can take a simple one-piece structure with lightweight, in contrast to the structure of the related art. Thus, the diff case 19 does not need to be separated into two pieces for the purpose of assembling an inner diff case into an interior of the diff case 19, thereby preventing the resulting remarkable increase in cost. In addition, no need arises for sizing up the gears 5, 11, and 13, forming the differential mechanism 15, for the purpose of avoiding interference with the inner diff case. This avoids a drop in torque capacity and therefore no need arises for increasing the number of pinion gears 5 for compensating the drop in torque capacity. Accordingly, the resulting increase in weight can be prevented.

With the present embodiment, also, the use of the snap ring 603 and the circumferential recess 605, by which the electromagnetic solenoid 25 is axially supported on the diff case 19, further improves the above-described unifying effect between the electromagnetic solenoid 25 and the diff case 19.

Other Embodiments

The differential mechanism applicable to the differential device of the present invention takes not only the differential mechanism of a bevel gear type but also a differential mechanism employing a gear mechanism of another type or a differential mechanism with no use of a gear mechanism.

Further, the clutch device of the present invention takes not only the device in which drive torque is connected or disconnected under ON-OFF modes between a pair of component members or a device in which differential action is locked but also a device in which a friction clutch is used to intermediately or continuously transfer connecting and disconnecting torque or differential limiting force.

Moreover, the differential device of the present invention is not used as not only the rear diff but also a front diff (a differential device operative to distribute drive torque, delivered from a prime mover, to left and right front wheels) or a center diff (a differential device operative to distribute drive torque, delivered from a prime mover, front and rear wheels).

Furthermore, the layout structure of the electromagnetic solenoid of the present invention takes not only a layout structure that prohibits the relative displacement of an electromagnetic solenoid and a diff case in the axial direction but also a layout structure that interconnects an electromagnetic solenoid and a diff case via a radial bearing and a layout structure that the electromagnetic solenoid is integrally fixed on the diff case using a slip ring to allow electric current to flow from a power supply lead wire to the electromagnetic solenoid.

Also, the differential device of the present invention can be applied to not only the differential limiting device, that is, a so-called diff lock device for locking differential rotation of the differential mechanism but also a free-running device, operative to connect or disconnect a delivery path of drive torque available for application to an input member to be transferred to a differential mechanism or an axle disconnecting device.

Additionally, the third and fourth embodiments may be altered in structure to allow the guide member 75 of the plunger 27 to be directly brought into abutment with the clutch ring 205 and the clutch ring 63 without intervening the intermediate pressing member 207.

As will be apparent from the foregoing description, since the clutch device of the present invention is structured to allow one members of the input members or the output members to form a part of a magnetic flux path of the electromagnetic solenoid, the electromagnetic solenoid can be miniaturized in structure by that extent, enabling the electromagnet type actuator and the whole of the clutch device to be miniaturized in structure.

With the clutch device of the present invention, the electromagnet type actuator is disposed in a manner not to suffer relative displacement in the axial direction with respect to the one members, suppressing fluctuation in magnetic field lines between the electromagnet type actuator and the one members for thereby enabling stable operation of the plunger to move in the axial direction.

With the clutch device of the present invention, the presence of the magnetic flux loop formed of the electromagnetic solenoid, the plunger and the one members provides the plunger with an axially moving force, enabling magnetic force to be further intensified.

With the clutch device of the present invention, the plunger is comprised of the magnetic material section and the non-magnetic material section and positioned with respect to the axial direction by permitting the clutch member to be brought into abutment with the non-magnetic material section, clearing a gap between the plunger and the clutch member in contrast to the related art structure. Thus, no need arises for the electromagnetic solenoid (electromagnet type actuator) to be formed in a large size with a view to increasing a stroke.

With the clutch device of the present invention, the clutch member, playing a role as the strengthening member (magnetic member), is not positioned on the diff case, thereby preventing the magnetization of the clutch member due to leakage flux while precluding adverse affects on the suction of the clutch member onto the diff case and operations of the differential limiting device and connecting and disconnecting device.

Accordingly, no need arises for taking ingenuities including decreasing leakage flux, reducing a sucking force of the clutch member or strengthening actuating force of the electromagnet type actuator. This prevents deterioration in installation capability of the electromagnet type actuator due to an increase in size thereof, an increase in cost and an increase in power consumption.

With the clutch device of the present invention, one member is formed with the protruding portions each with a circumferential length for permeating the magnetic field lines to the plunger, thereby enabling the magnetic field lines to permeate between the plunger and one member in a reliable manner.

Further, with the differential device of the present invention, the electromagnetic solenoid is placed on one member not to be subjected to relative displacement in the axial direction to allow one member to be utilized as a part of the magnetic flux path of the electromagnetic solenoid. This enables the electromagnet type actuator (electromagnetic solenoid) to be miniaturized by that extent, especially resulting in a decrease in dimension in width.

With the differential device of the present invention, the electromagnet type actuator is placed not to axially move to one member, thereby suppressing fluctuation in the magnetic field lines between the electromagnet type actuator and one member for thereby enabling the plunger to axially move in a stable fashion.

With the differential device of the present invention, even if the electromagnet type actuator is placed in an area closer to the clutch member of the input member, no interference occurs with associated component parts such as the bearing with the resultant increase in a range of models available to be installed.

With the differential device of the present invention, also, the plunger is comprised of the magnetic material section and the non-magnetic material section to allow the clutch member to be brought into abutment with the non-magnetic material member for achieving the positioning in the axial direction. This prevents clearances from being created between the plunger and the clutch member in contrast to the related art structure and no need arises for the electromagnetic solenoid (electromagnet type actuator) to be formed in a large size in structure for the purpose of increasing a stroke.

With the differential device of the present invention, no positioning of the clutch member, playing a role as a strengthening member (magnetic member), is made on the diff case in contrast to the structure of the related art, thereby precluding the clutch member from being magnetized due to leakage flux while preventing the clutch member from being stick to the diff case and precluding adverse affect from acting on the operation of the differential limiting device.

Accordingly, no need arises for taking ingenuities including decreasing leakage flux, reducing a sucking force of the clutch member or strengthening actuating force of the electromagnet type actuator. This prevents deterioration in installation capability of the electromagnet type actuator due to an increase in size thereof, an increase in cost and an increase in power consumption.

With the differential device of the present invention, the presence of the differential limiting device placed in association with one of the input member and the output member enables the plunger to be supported with, for instance, the input member. Therefore, the plunger can have an increased degree of concentricity, resulting in improved supporting capabilities and workability.

With the differential device of the present invention, the use of the plunger supported with the input member allows the input member to have an increased degree of concentricity, resulting in improved supporting capabilities and workability.

This application is based upon the Japanese Patent Application No. 2005-255464, filed on Sep. 2, 2005, and the Japanese Patent Application No. P2006-184240, filed on Jul. 4, 2006, the entire contents of which are incorporated by reference herein.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A clutch device comprising: an input member rotatable with drive torque; an output member to which the drive torque is transferred from the input member; a clutch member held in constant connection with one member of the input member or the output member and axially movable to the other member to be intermittently coupled; and an electromagnetic actuator including an electromagnetic solenoid and a plunger axially movable in response to magnetic force generated by the electromagnetic solenoid to axially shift the clutch member; wherein the electromagnetic solenoid is disposed on the one member so as not to relatively move in an axial direction and the one member serves as a part of a magnetic flux path formed by the electromagnetic solenoid, wherein the electromagnetic solenoid, the plunger, and the one member form a complete magnetic flux loop as the magnetic flux path to cause the plunger to provide axially moving force to the clutch member in response to magnetic force generated by the electromagnetic solenoid, and wherein the complete magnetic flux loop is composed of a first loop segment passing through the electromagnetic solenoid, a second loop segment following the first loop segment and passing through the one member, and a third loop segment following the second loop segment and passing through the plunger, the third loop segment being connected to the first loop segment;

wherein the one member includes protruding portions each with a circumferential length through which permeates a magnetic flux to the plunger, and the one member is operative such that when the plunger is axially moved in response to magnetic force generated by the electromagnetic solenoid, the plunger is placed in opposition to the protruding portions with a minimal clearance in a radial direction.

2. A clutch device comprising:

an input member rotatable with drive torque;

an output member to which the drive torque is transferred from the input member;

a clutch member held in constant connection with one member of the input member or the output member and axially movable to the other member to be intermittently coupled; and an electromagnetic actuator including an electromagnetic solenoid and a plunger axially movable in response to magnetic force generated by the electromagnetic solenoid to axially shift the clutch member; wherein the electromagnetic solenoid is disposed on the one member so as not to relatively move in an axial direction and the one member serves as a part of a magnetic flux path formed by the electromagnetic solenoid, wherein the plunger includes a magnetic material section and a non-magnetic material section and the clutch member is held in abutment with the non-magnetic material section to be axially positioned, and wherein the one member includes protruding portions each with a circumferential length through which permeates a magnetic flux to the plunger, and the one member is operative such that when the plunger is axially moved in response to magnetic force generated by the electromagnetic solenoid, the plunger is placed in opposition to the protruding portions with a minimal clearance in a radial direction.

3. The clutch device according to claim 2, wherein the electromagnetic solenoid, the plunger, and the one member form a magnetic flux loop as the magnetic flux path, and the plunger provides axially moving force to the clutch member in response to magnetic force generated by the electromagnetic solenoid.

4. A differential device comprising:

an input member rotatable with drive torque;

a differential member to which the drive torque is transferred from the input member;

a differential mechanism including first and second output members coupled in relative rotation with the differential member via a torque transfer section that receives the drive torque;

a differential limiting mechanism including a clutch limiting differential rotation of the differential mechanism, and an electromagnetic actuator having an electromagnetic solenoid and a plunger axially movable in response to magnetic force generated by the electromagnetic solenoid to axially shift the clutch member; wherein the electromagnetic solenoid is disposed on the input member so as not to relatively move in an axial direction and the input member serves as a part of the electromagnetic solenoid, wherein the plunger includes a magnetic material section and a non-magnetic material section integrally connected to the magnetic material section, and the clutch member is held in abutment with the non-magnetic material section to be axially positioned, and wherein one member of the input member and the differential member includes protruding portions each with a circumferential length through which permeates a magnetic flux to the plunger, and the one member is operative such that when the plunger is axially moved in response to magnetic force generated by the electromagnetic solenoid, the plunger is placed in opposition to the protruding portions with a minimal clearance in a radial direction.

5. The differential device according to claim 4, wherein the input member includes a flange portion to which the drive torque is transferred and which is located on the input member on one side thereof in an axial direction, and the actuator is placed adjacent to the flange portion.

6. The differential device according to claim 4, wherein the differential limiting mechanism is disposed between the input member and one of the first and second output members.

7. The differential device according to claim 4, wherein the plunger is supported on the input member.

* * * * *